US006618394B1

(12) United States Patent
Hilleary

(10) Patent No.: US 6,618,394 B1
(45) Date of Patent: Sep. 9, 2003

(54) METHODS AND APPARATUS FOR ECONOMICAL UTILIZATION OF COMMUNICATION NETWORKS

(75) Inventor: Thomas N. Hilleary, Chesterfield, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/347,168

(22) Filed: Jul. 2, 1999

Related U.S. Application Data
(60) Provisional application No. 60/093,706, filed on Jul. 22, 1998.

(51) Int. Cl.[7] .............................. H04J 3/16; H04J 3/22
(52) U.S. Cl. ...................................... 370/469; 370/464
(58) Field of Search ................................ 370/465, 466, 370/467, 468, 469, 329; 455/411, 414, 420, 419, 552, 553, 461, 551, 466; 709/227, 228, 229

(56) References Cited

U.S. PATENT DOCUMENTS

| | | | | |
|---|---|---|---|---|
| 5,029,183 A | * | 7/1991 | Tymes | 370/338 |
| 5,142,550 A | * | 8/1992 | Tymes | 370/479 |
| 5,546,444 A | * | 8/1996 | Roach et al. | 455/412 |
| 5,794,144 A | | 8/1998 | Comer | |
| 5,875,395 A | | 2/1999 | Holmes | 455/420 |
| 6,108,325 A | * | 8/2000 | Stephanson et al. | 370/337 |
| 6,141,544 A | | 10/2000 | Corriveau et al. | 455/411 |
| 6,195,547 B1 | | 2/2001 | Corriveau et al. | 455/419 |
| 6,199,068 B1 | * | 3/2001 | Carpenter | 340/870.03 |
| 6,393,014 B1 | * | 5/2002 | Daly et al. | 370/331 |
| 6,396,819 B1 | * | 5/2002 | Fleeter et al. | 370/320 |
| 6,397,056 B1 | | 5/2002 | Bugnon et al. | 455/411 |
| 6,463,154 B1 | | 10/2002 | Patel | 380/270 |
| 2002/0004382 A1 | | 1/2002 | Cox et al. | 455/414 |

FOREIGN PATENT DOCUMENTS

WO    WO 9908456 A1 *    2/1999    ............ H04Q/7/00

OTHER PUBLICATIONS

Open Cellular Systems, Inc., *ScadaNET Network*, 1998, pp. 1–4.

* cited by examiner

*Primary Examiner*—Wellington Chin
*Assistant Examiner*—Jamal A. Fox
(74) *Attorney, Agent, or Firm*—Carl A. Rowold, Esq.; Armstrong Teasdale LLP; Robert B. Reeser III

(57) ABSTRACT

A communication system is provided that includes a plurality of remote terminal units (RTUs) that communicate with a server via a network. The network provides communication paths to the RTUs via both a sessionless protocol and a switched connection protocol. Generally, the RTUs communicate via the network using the sessionless protocol. The network also includes a server. The RTUs share at least one account identifier that is coordinated by the server. Short messages are sent via the sessionless protocol. Longer messages are sent via the switched connection protocol using a shared account identifier. A corresponding method of operating the network is also provided. The use of a shared account identifier avoids the requirement of obtaining access accounts to the switched connection protocol for each of the RTUs, and is especially efficient and economical when the need to communicate longer messages is infrequent, but where each of a large number of RTUs require this capability.

44 Claims, 5 Drawing Sheets

METHODS AND APPARATUS FOR ECONOMICAL UTILIZATION OF COMMUNICATION NETWORKS

CROSS-REFERENCE TO RELATED APPLICATION

This application claims the benefit of U. S. Provisional Application No. 60/093,706, filed Jul. 22, 1998.

BACKGROUND OF THE INVENTION

This invention relates to methods and apparatus for communicating via a communication network, and more particularly to methods and apparatus for efficiently and economically communicating via a public network utilizing a shared account.

Public networks offer specialized, low-cost communication modes for the delivery of small packets of alarm and status information such as from remote industrial facilities. For example, networks operating in the Advanced Mobile Phone Service (AMPS) cellular network provide such communication modes via a cellular control channel, while networks operating in the Personal Communications Service (PCS) and Global System for Mobiles (GSM) offer Short Messaging Services (SMS) or equivalent services. Small data packets from remote terminal units (RTUs) are delivered via the low cost communication modes utilizing a sessionless, store-and-forward protocol. The maximum message length permitted by the protocol varies from system to system, but is typically equivalent to between 14 and 256 alphanumeric characters. Typical uses for SMS protocol in an industrial setting include the communication of alarm signals, switch closures, and event counts to a central computer via the network.

Occasionally, it is necessary in some applications to communicate more voluminous amounts of data to or from an RTU than can be efficiently handled using these low-cost communication modes. This need may arise, for example, hen an event logging function associated with an RTU is to be reprogrammed, or when a data history of a dynamometer associated with an RTU is to be uploaded to a central computer. In such cases, the need for wider bandwidth could be fulfilled by the RTU resorting to a switched connection protocol, e.g., placing a regular cellular or PCS call, to more rapidly and efficiently communicate larger data volumes. However, to be permitted to place a regular cellular or PCS call, a cellular or PCS subscriber account agreement is required. All such subscriber agreements have heretofore involved a monthly fee arrangement, the cost of which has hampered the development and spread of remote data collection applications. Network carriers have, in some instances, discounted the monthly cost of the service, but to date have still required an account for each RTU in a system. Where large numbers of RTUs need access to switched connection services for high volumes of data only occasionally, a large number of monthly service fees must be paid.

It would thus be desirable to provide methods and apparatus for utilization of low volume, low cost network data communication modes when feasible, and efficient and low cost use of high volume network data communication mode in systems in which the latter mode is infrequently required, in systems with multiple RTUs.

BRIEF DESCRIPTION OF THE INVENTION

In one embodiment of the invention, a communication system is provided that has a plurality of remote terminal units (RTUs) that communicate via a network using a sessionless protocol and a switched connection protocol. RTUs communicate with a centralized server via the network. Short messages are communicated between the RTUs and the server utilizing the sessionless protocol. Examples of suitable sessionless protocols are cellular control channels, and the SMS protocol provided by GSM and PCS, or equivalent protocols in other systems. To communicate longer messages, the RTUs are configured to use at least one account identifier in a coordinated manner to communicate the longer messages via a switched connection protocol of the network.

In another embodiment of the invention, an RTU is provided that is configured to communicate data via a network using both a sessionless protocol and a switched connection protocol. The RTU is also configured to identify itself to the network using a first account identifier when communicating via the sessionless protocol, and to use a second account identifier different from the first account identifier when communicating via the switched connection protocol. In one embodiment of the RTU, the second account identifier is a shared account identifier identified by a server via the network, using the lower cost sessionless protocol.

In yet another embodiment of the invention, a method of operating a communication system including a plurality of remote terminal units communicating via a network is provided. Each RTU identifies itself to the network utilizing a unique account identifier to communicate in a first communication mode, and each RTU identifies itself to the network utilizing at least one shared account identifier to communicate in a second communication mode. The use of the shared account identifier is coordinated by a centralized server. In one embodiment, the first communication mode is a sessionless protocol mode, and the second communication mode is a switched connection protocol mode.

In still another embodiment of the invention, a server is provided for controlling access by a plurality of RTUs to a network. The server is configured to communicate commands to an RTU to conduct a switched connection protocol session via the network. The server is also configured to assign a shared network account identifier to the RTU for switched connection protocol access to the network and to coordinate usage of the shared network account identifier among the plurality of RTUs. A corresponding method of operating a server is also provided.

It will be seen that the various embodiments of the invention provide users of low cost modes of public communication networks to economically deploy large, widely dispersed, low-volume data networks while retaining a low-cost method for handling occasional high-volume data transfers.

DETAILED DESCRIPTION OF THE INVENTION

Figure 1:
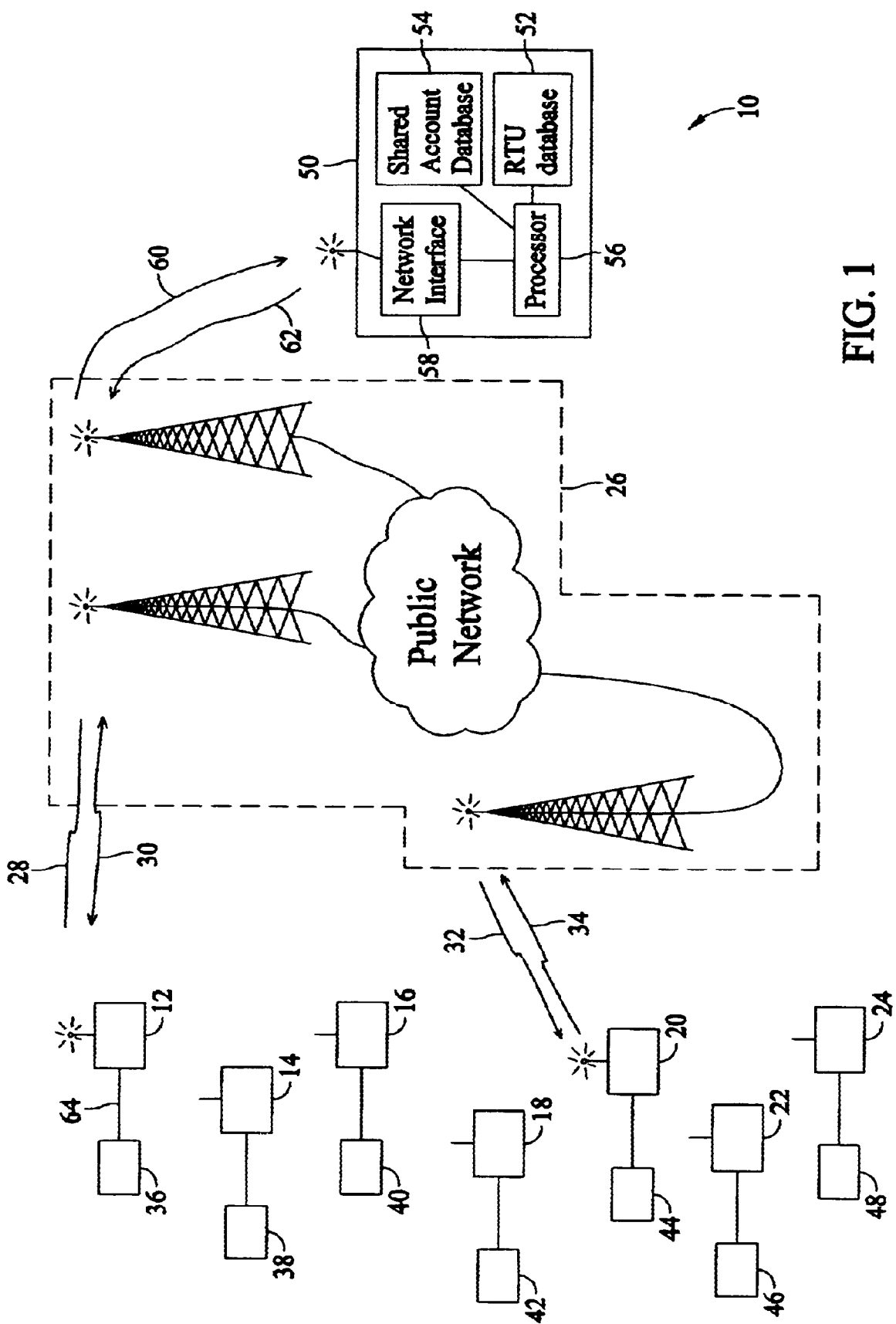
FIG. 1 is a block diagram of an embodiment of a communication system.

FIG. 1 is a block diagram of an embodiment of a communication system 10 in accordance with the invention. In the represented embodiment, a number of remote terminal units (RTUs), for example, RTUs 12, 14, 16, 18, 20, 22, and 24, are in communication with a wireless network 26. Examples of digital wireless networks are Personal Communications Services (PCS) networks, Global System for Mobile Communications (GSM) networks, time division multiple access (TDMA) networks and code division multiple access (CDMA) networks. Messages communicated by RTUs 12, 14, 16, 18, 20, 22, and 24 are communicated via wireless links such as radio links 28, 30, 32, and 34. It will be understood that communication system 10 generally coexists in an environment in which many other devices (not shown), including mobile telephones (not shown), are in communication or are capable of communicating with network 26. It will also be understood that the number of RTUs 12, 14, 16, 18, 20, 22, and 24 shown in FIG. 1 is exemplary only. A communication system 10 in accordance with the invention may comprise any number of RTUs.

Each RTU 12, 14, 16, 18, 20, 22, and 24 monitors a device or a system, for example, devices 36, 38, 40, 42, 44, 46, and 48, respectively, generally at different and possibly widely-spaced locations. Devices 36, 38, 40, 42, 44, 46, and 48 infrequently generate alarms, switch closures, status messages or other signals that can be encoded as a short message and transmitted by a respective RTU 12, 14, 16, 18, 20, 22, 24 in a sessionless protocol with network 26, which is typically a limited capacity, low cost service such as SMS. In the typical industrial application shown in FIG. 1, messages are relayed via the sessionless protocol by network 26 to a central server 50. Central server 50 includes an RTU database 52, a shared account database 54, a processor 56, and a network interface 58. RTU database 52 maintains the location and status of all RTUs 12, 14, 16, 18, 20, 22, and 24. Shared account database 54 includes information about at least one switched connection account that is shared among RTUs 12, 14, 16, 18, 20, 22, and 24. Processor 56 processes information from shared account database 54 and RTU database 52 and communicates with network 26 via network interface 58, such as via radio links 60 and 62. It will be understood that central server 50 also comprises means (not shown) to render information received from RTUs 12, 14, 16, 18, 20, 22, and 24 into a useful form for the application in which communication system 10 is used. For example, data may be stored in a storage device, displayed visually or audibly, or used for generation of automatic control signals. The wide applicability of the invention will suggest other forms of data utilization to those skilled in the art.

The embodiment represented in FIG. 1 utilizes wireless transmission modes. In other embodiments, other types of transmission modes are used. For example, in one embodiment, a wire network having both sessionless and switched connection communication modes is utilized as network 26. In other embodiments, combinations of wired and wireless communication transmission modes are used. In each embodiment, network 26 has both a sessionless and a switched communication protocol mode. Network 26 not necessarily be a digital network, inasmuch modems may be used for communication of digital data over analog networks.

Figure 2:
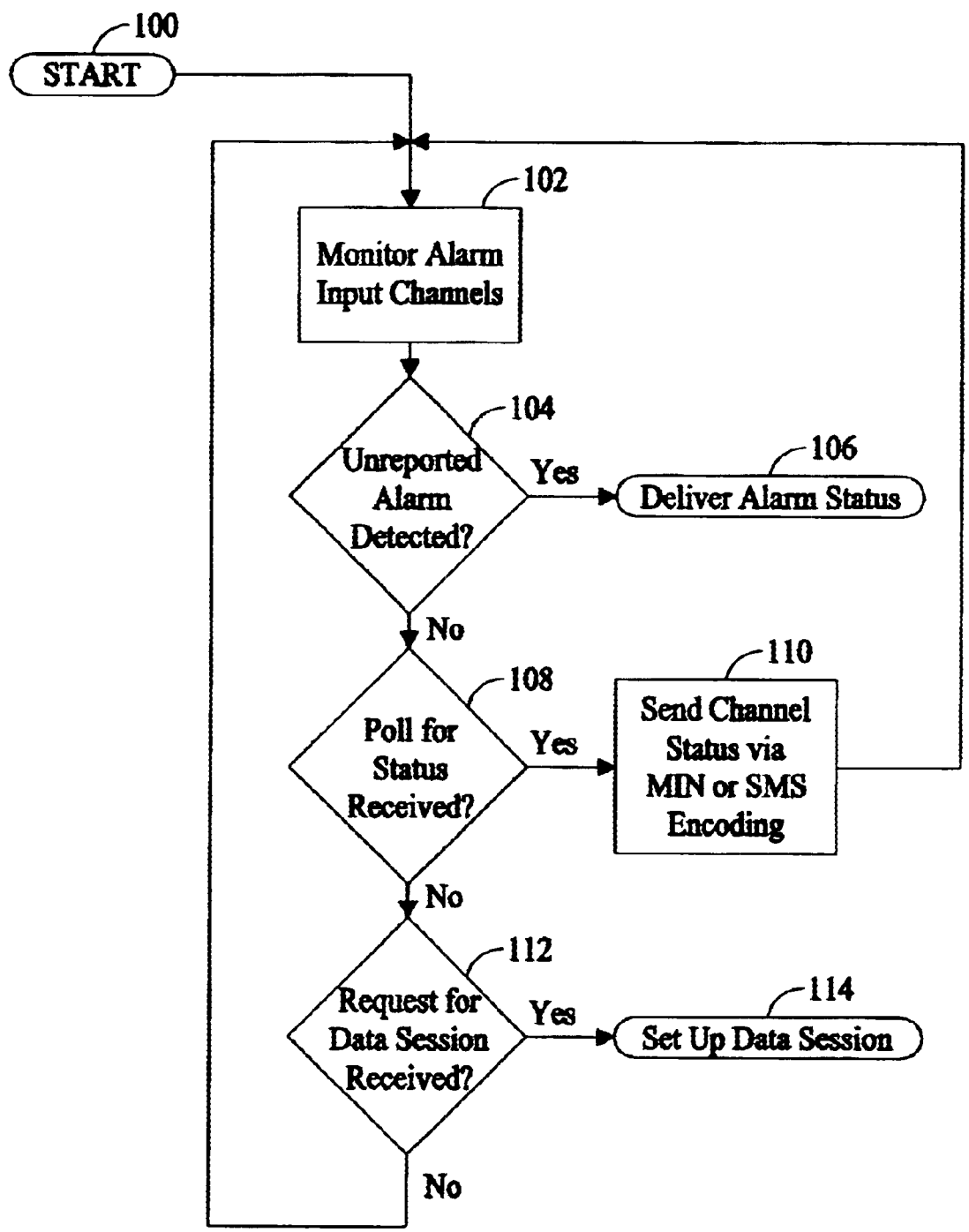
FIG. 2 is a flow chart of a method of operating a remote terminal unit (RTU) in accordance with the present invention.

FIG. 2 is a flow chart of an embodiment of a method used in communication system 10 by an RTU, for example RTU 12, to communicate with central server 50. Starting at 100, RTU 12 monitors 102 one or more input channels, such as a serial channel 64 (see FIG. 1) between RTU 12 and device 36. For example, device 36 monitors a flow, level, temperature or pressure and communicates an alarm to RTU 12 when the monitored parameter exceeds a certain threshold. If an unreported alarm is detected 104, an alarm status is reported 106 to central server 50 using low cost, sessionless control channel or SMS communication protocols. In one embodiment, alarm events require acknowledgment from server 50, or else RTU 12 will repeatedly attempt to communicate the alarm status to server 50 at intervals until an acknowledgment is received. It will be understood that data other than alarm status can be communicated in this manner, and that what is said herein about RTU 12 and its associated remote device 36 and serial channel 64 may be generalized to any RTU in communication system 10 and its associated remote device and electronic coupling thereto.

RTU 12 determines whether query or poll information has been received 108 from server 50, for example, via sessionless control channel or SMS communication protocols. When such a query or poll is received 108, RTU 12 sends its current status 110 via sessionless control channel or SMS communication protocols and then returns to monitoring of the input channels 102. If server 50 does not receive a current status response 110 from RTU 12 within an anticipated time period, server 50 can repeat the query or poll.

RTU 12 also determines 112 whether a command has been received 112 from server 50 to set up an end-to-end data session using a switched circuit channel rather than sessionless control channel or SMS channel protocols. When such a command is received 112, a data session is set up 114. This data session allows communication of a higher volume of data to or through RTU 12 (for example, to initialize or reprogram device 36) than sessionless control channel or SMS techniques can effectively or economically accommodate. If no data session is to be set up, RTU 12 returns to the monitoring 102 of alarm input channels.

It will be appreciated that RTU 12 itself can be provided with the ability to request that a data session utilizing a switch circuit channel be set up by configuring RTU 12 to deliver 106, in appropriate circumstances, an alarm status recognized by server 50 as a code for such a request. Server 50 then responds to the alarm status code by issuing the command 112 to set up an end-to-end data session.

Figure 3:
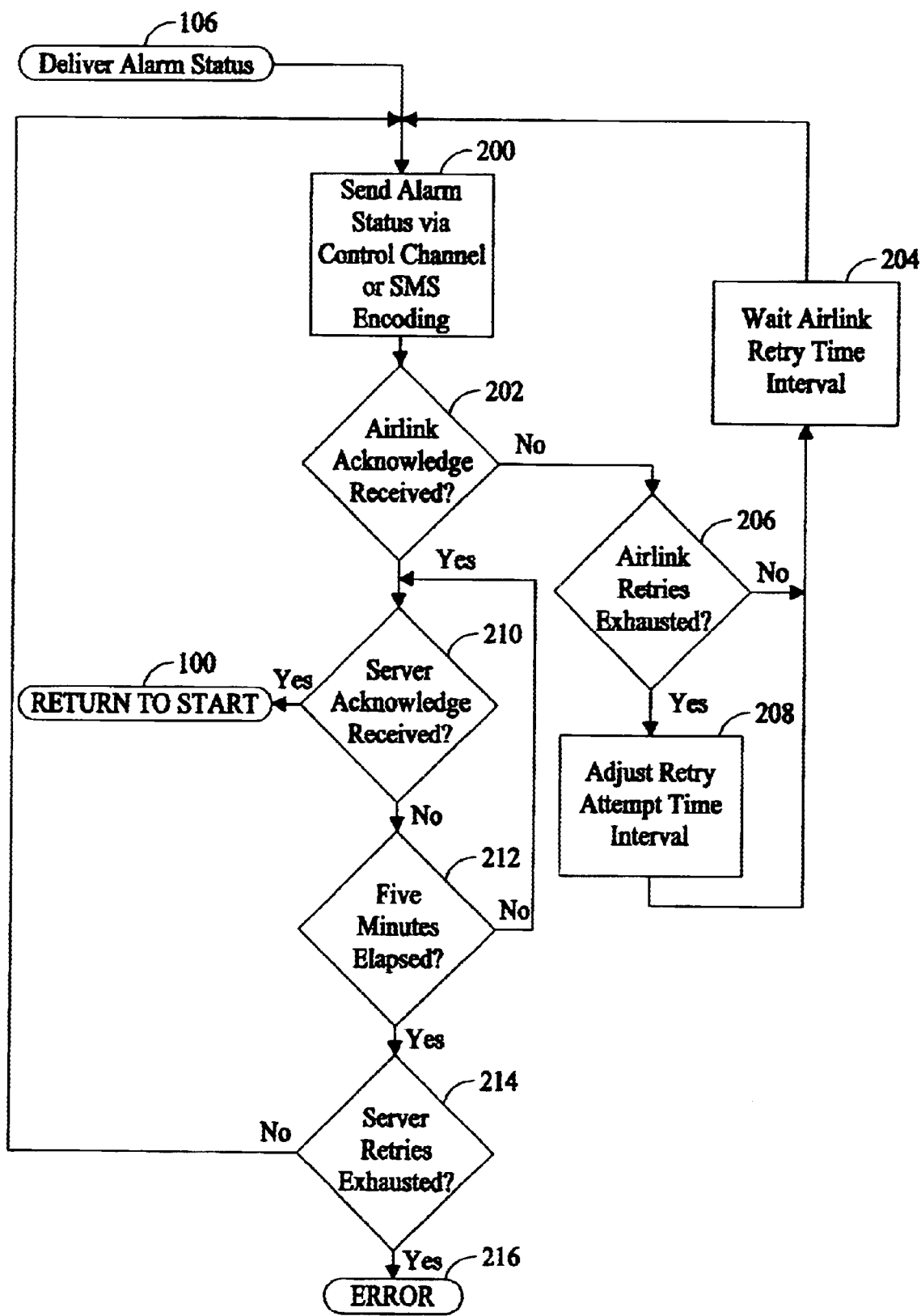
FIG. 3 is a flow chart of a method for delivering alarm status information from an RTU.

In one embodiment and referring to FIG. 3, delivery of alarm status 106 is performed by transmission 200 of the alarm status via low cost, sessionless control channel or SMS communication protocol using a mobile identification number (MIN) assigned to RTU 12 to identify a service account and to access network 26. RTU 12 next determines 202 whether network 26 has acknowledged that the transmitted alarm has been received, indicating that it is successfully en route to server 50. If no acknowledgment is received and a predetermined number of retries is not exhausted, RTU 12 will wait 204 a predetermined period of time to retransmit 200 the alarm. If a selected number of retries is attempted without success 206, other retry strategies, for example, adjustment 208 of the retry attempt interval, are implemented.

If an acknowledgment from network 26 is received that the alarm message is en route to server 50, RTU 12 then checks 210 for an acknowledgment from server 50. If an acknowledgment is received, RTU 12 returns to start 100. Depending upon service limitations placed upon use of the sessionless control channel or SMS communication protocol by the carrier, RTU 12 may be required to wait some period of time before initiating further alarm messages or responding to messages from server 50.

If an acknowledgment is not received from server 50, RTU 12 will wait 212 a predetermined amount of time, for example, five minutes, until an acknowledgment is received. If an acknowledgment is not received within that time, it will attempt to send 200 another alarm message, unless RTU 12 determines 214 that a predetermined number of retry attempts have been exhausted. If the predetermined number of retry attempts has been exhausted, RTU 12 enters an error condition 216, which, in one embodiment, requires manual intervention.

Figure 4:
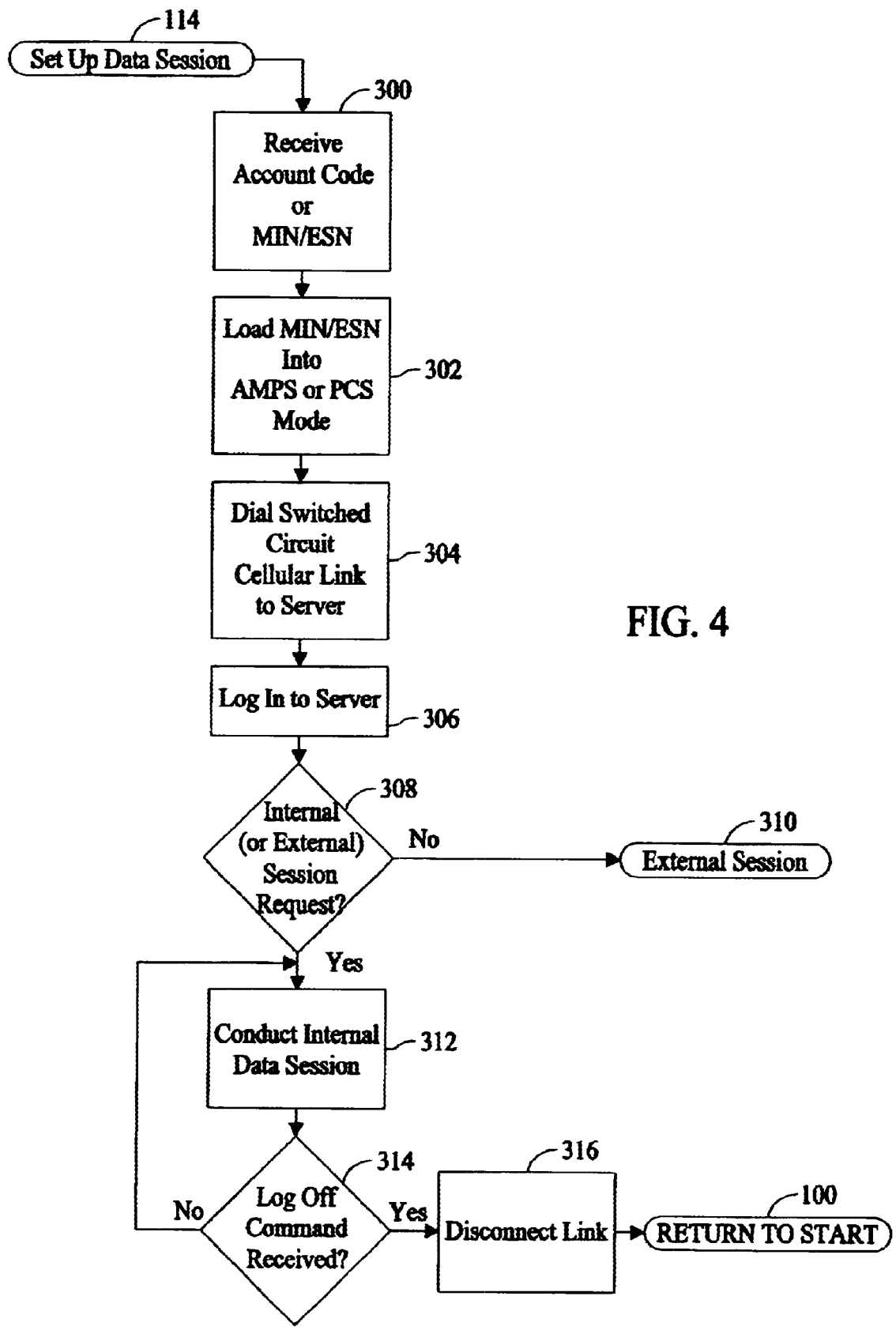
FIG. 4 is a flow chart of a method for setting up an RTU for a data session via a switched connection protocol.

In one embodiment and referring to FIG. 4, setting up a data session 114 begins by RTU 12 receiving 300 a shared account identifier transmitted by server 50. For example, the shared account identifier transmitted by server 50 and received by RTU 12 is a valid MIN/equipment serial number (ESN) combination. In another embodiment, each RTU 12, 14, 16, 18, 20, 22, and 24 is provided with an list of valid, pre-established account identifiers, and server 50 transmits an indication of a shared account identifier. For example, when controlling RTU 12 for switched circuit access, server 50 transmits a code to RTU 12 that points to a pre-established valid account identifier stored in a memory of RTU 12. In this manner, the transmitted code indirectly identifies an account identifier. The total number of different valid, pre-established account identifiers is less than the total number of RTUs in communication system 10 to effect a reduction in the number of different switched circuit access accounts that must be opened with the network carrier in accordance with the invention. However, embodiments of the present invention can utilize more than one account in cases in which more than one account is available.

It should be noted that it will suffice in at least one embodiment for server 50 to transmit a only a control signal to RTU 12 without any account identifier or indication thereof, if RTU 12 has one or more account identifiers stored in memory and appropriate measures are taken to prevent simultaneous use of the same account identifier by more than one RTU. For example, server 50 can coordinate use of shared account identifiers by ensuring that no more than one RTU is engaged in a switched circuit session at a time, or by ensuring that only one RTU in any group of RTUs having identical account identifiers stored in memory are engaged in simultaneous switched circuit sessions.

Again referring to FIG. 4, in one embodiment, the received MIN/ESN is stored or loaded 302 into a circuit switched radio component (not shown) of RTU 12, placing RTU 12 into a circuit switched mode, for example, Advanced Mobile Phone Service (AMPS) cellular mode, or PCS mode. RTU 12 then dials 304 a switched circuit cellular link to server 50, or, in other words, places a phone call to server 50. Shared account database 54 is also updated by server 50 to coordinate usage of the shared account or accounts. In one embodiment, shared account database 54 is updated by server 50 to indicate that the MIN/ESN combination temporarily assigned to RTU 12 is exclusively assigned and is therefore not currently available for assignment to any other RTU. As a security measure to prevent unauthorized access, RTU 12 then logs 306 into server 50. RTU 12 is then ready for higher volume data transfer with server 50 via this circuit switched mode call than is possible using the sessionless control channel or SMS communication protocol.

In one embodiment, server 50 requests an external session with equipment 36 external to RTU 12 or an internal session with RTU 12 itself Thus, RTU 12 determines 308 what type of session is being requested by server 50. If an external session is requested, an external routine 310 is executed by RTU 12 as described below in more detail. Otherwise, an internal data session is conducted 312 in which RTU 12 and server 50 exchange data. Server 50 also interacts with RTU 12 by issuing commands that pertain only to RTU operation. For example, these commands include a code that instructs RTU 12 to terminate 314 the session and disconnect 316 the switched circuit link so that RTU 12 returns to start 100, ready for communication of alarms. When RTU 12 logs off 314 server 50, server 50 updates shared account database 54 to make the MIN/ESN combination that was used by RTU 12 available for assignment again. RTU 12 also returns to sessionless control channel or SMS communication protocol and no longer uses the MIN/ESN combination temporarily assigned by server 50, unless and until the MIN/ESN combination is assigned by server 50 again at some later time.

Figure 5:
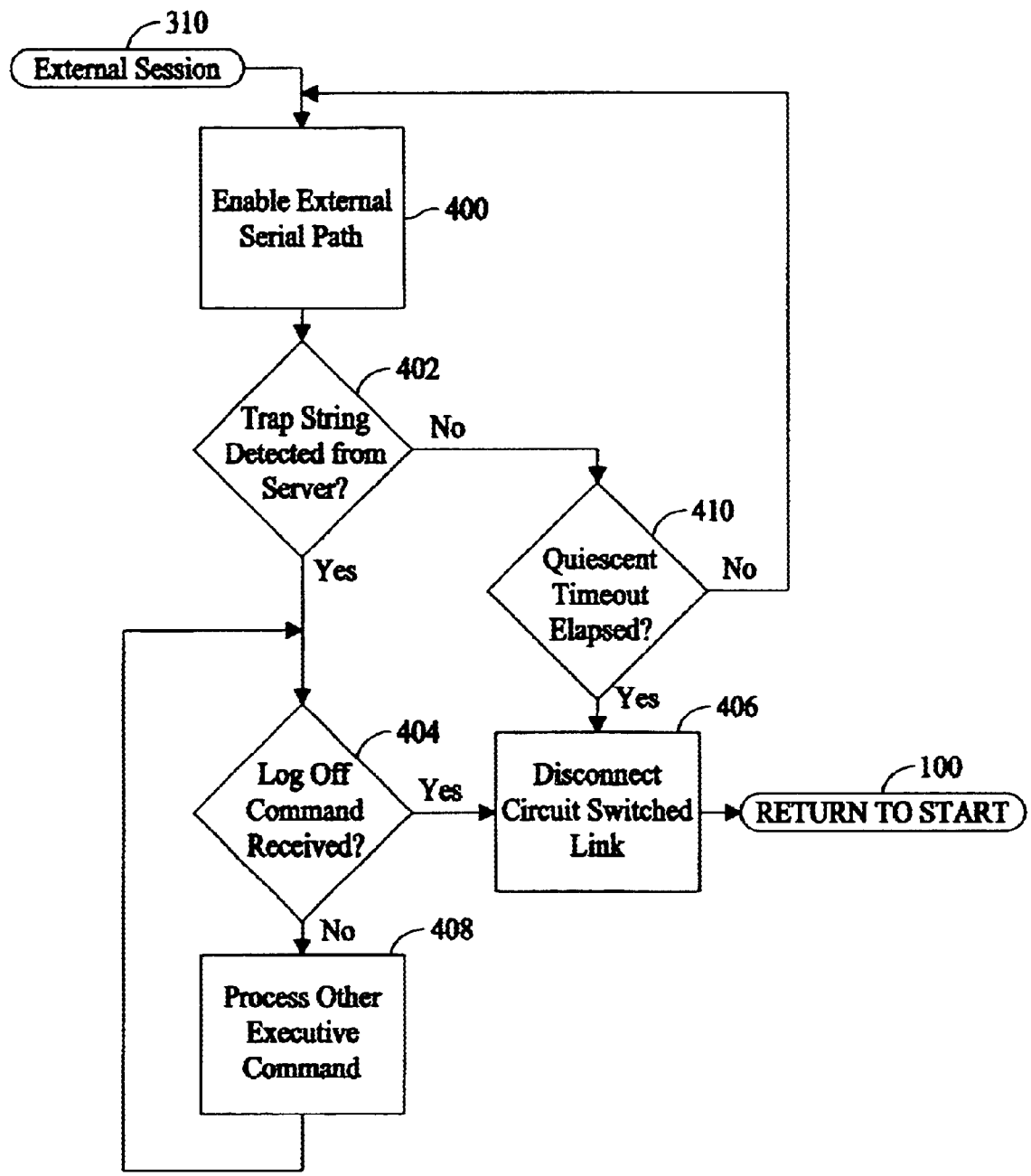
FIG. 5 is a flow chart of a method for exchanging data between an RTU and a server after a data session is established, and for taking down the data session after its completion.

In one embodiment and referring to FIG. 5, when an external session 310 is requested by server 50, RTU 12 readies serial channel 64 to external device 36. RTU 12 then enables 400 serial channel 64 and sends a response code back to server 50. Subsequent communication over the switched circuit path will then be between server 50 and device 36 until a preassigned trap code or string from server 50 is detected 402 by RTU 2. A trap code or string is sent by server 50 to regain the attention of RTU 12, for example, to discontinue the session or to perform other tasks involving server 50 and RTU 12. After the trap string is detected 402, RTU 12 determines 404 whether a log off command has been received. If a logoff command has been received, the circuit switch link is disconnected 406 and RTU 12 returns to start 100, ready for communication of alarms. When RTU 12 logs out, server 50 updates shared account database 54 to make the MIN/ESN combination that was used by RTU 12 available for assignment again. RTU 12 also returns to sessionless control channel or SMS communication protocol and no longer uses the MIN/ESN combination temporarily assigned by server 50, unless and until the MIN/ESN combination is assigned by server 50 again at some later time.

Before a log off command is received 404, RTU 12 processes, if required, other commands 408. For example, in one embodiment in which a code that points to a pre-established valid MIN/ESN combination in a memory (not shown) of RTU 12 is communicated from server 50 to RTU 12, an instruction to update the valid, pre-established MIN/ESN combinations in the memory of RTU 12 is sent from server 50 to RTU 12.

If serial communication between external device 36 and server 50 (through RTU 12) ceases for more than a predetermined period of time, RTU 12 determines 410 that a time-out has occurred and automatically disconnects 406 the switched circuit link to prevent excessive link times when serial communication is disrupted.

It will be recognized that the herein described methods and apparatus provide efficient and economical use of networks, for example wireless digital and cellular networks, that offer reduced cost, low-volume sessionless communication protocols and higher cost, switched connection protocols.

Although various embodiments of the invention have been described and illustrated in detail, it is to be understood that the same is intended by way of illustration and example only and is not to be taken by way of limitation. For example, it is not necessary that network 26 be a cellular or even a wireless network, or that RTUs 12, 14, 16, 18, 20, 22, and 24 and server 50 communicate via radio links. Other modifications and variations of the invention will also become apparent to those skilled in the art. Accordingly, the spirit and scope of the invention are to be limited only by the terms of the appended claims, and equivalents thereto.

What is claimed is:

1. A communication system comprising a plurality of remote terminal units (RTUs) communicating with a server via a network having both a sessionless protocol and a switched connection protocol, wherein said RTUs are configured to share at least one account identifier for said switched connection protocol and said server is configured to coordinate usage of said at least one shared account identifier.

2. A communication system in accordance with claim 1 wherein said at least one account identifier is a pre-established account identifier, and said server is configured to coordinate exclusive usage of said at least one account identifier.

3. A communication system in accordance with claim 1 wherein said RTUs are configured to communicate short data messages utilizing said sessionless protocol, and to communicate long data messages longer than said short data messages utilizing said switched connection protocol.

4. A communication system in accordance with claim 1 wherein said RTUs comprise cellular modems configured to communicate said short data messages via at least one of a cellular control channel and a short messaging services (SMS) protocol.

5. A communication system in accordance with claim 4 wherein said switched connection protocol includes a circuit switched cellular protocol.

6. A communication system in accordance with claim 5 wherein said RTU is configured to send a request over the at least one of the cellular control channel and the SMS protocol to conduct a switched connection protocol session, and to receive a said shared account identifier via the network.

7. A communication system in accordance with claim 6 further comprising a server configured to communicate said at least one shared account identifier via the network to said requesting RTU.

8. A communication system in accordance with claim 7 wherein said at least one shared account identifier is a pre-established mobile identification number (MIN) and a pre-established equipment serial number (ESN).

9. A communication system in accordance with claim 8 wherein each said RTU has an individually assigned MIN and an individually assigned ESN, and wherein each said RTU is configured to identify itself to the network with said individually assigned MIN and ESN to communicate over the at least one of the cellular control channel and the SMS protocol, and to identify itself to the network with a said pre-established MIN and ESN to communicate utilizing said switched connection protocol.

10. A communication system in accordance with claim 1 wherein said RTUs comprise modems configured to communicate via a time division multiple access (TDMA) network.

11. A communication system in accordance with claim 10 wherein the network is a wireless digital network.

12. A remote terminal unit (RTU) comprising a cellular modem, said RTU configured to:

communicate data via a network using both a sessionless protocol and a switched connection protocol; and use a first account identifier when communicating via said sessionless protocol, and use a second account identifier different from said first account identifier when communicating via said switched connection protocol.

13. An RTU in accordance with claim 12 wherein said first account identifier is pre-programmed into said RTU, and said second account identifier is an account identifier indirectly identified by a communication from a server via the network.

14. An RTU in accordance with claim 12 wherein said RTU is configured to communicate short data messages utilizing said sessionless protocol, and to communicate long data messages longer than said short data messages utilizing said switched connection protocol.

15. An RTU in accordance with claim 12 wherein said cellular modem is configured to communicate said short data messages via at least one of a cellular control channel and a Short Messaging Services (SMS) protocol.

16. An RTU in accordance with claim 15 wherein said cellular modem is configured to communicate said long data messages via a circuit switched cellular protocol.

17. An RTU in accordance with claim 16 wherein said RTU is configured to send a request over the at least one of the cellular control channel and the SMS protocol to conduct a switched connection protocol session, and to receive the second account identifier via the network.

18. An RTU in accordance with claim 17 wherein said second account identifier is a pre-established mobile identification number (MIN) and a pre-established equipment serial number (ESN).

19. An RTU in accordance with claim 12 wherein said RTUs are configured to communicate via a time-division multiple access (TDMA) protocol.

20. An RTU in accordance with claim 19 wherein said RTUs are configured to communicate said time-division multiple access (TDMA) protocol over a wireless digital network.

21. An RTU in accordance with claim 12 wherein said first account identifier and said second identifier are pre-programmed into said RTU.

22. An RTU in accordance with claim 21 wherein said RTU is configured to select said second identifier from a list of identifiers pre-programmed into said RTU.

23. An RTU in accordance with claim 22 wherein said RTU is configured to select said second identifier in response to a command received via the sessionless protocol.

24. An RTU in accordance with claim 23 wherein said RTU is configured to select said second identifier from said list of identifiers in accordance with an identifier indication received via the sessionless protocol.

25. A method of operating a communication system including a plurality of remote terminal units (RTUs) using a network to communicate, said method comprising the steps of:

each RTU utilizing a unique account identifier to communicate in a first communication mode;

each RTU utilizing at least one shared account identifier to communicate in a second communication mode; and coordinating each RTU's use of the at least one shared account identifier.

26. A method in accordance with claim 25 further comprising the step of the RTU transmitting a permission request prior to communicating in the second communication mode.

27. A method in accordance with claim 26 further comprising the step of the RTU receiving the shared account identifier via the network in response to said step of transmitting a permission request.

28. A method in accordance with claim 27 further comprising the step of the RTU receiving a command via the network to transmit in the second communication mode.

29. A method in accordance with claim 25 wherein the first communication mode is a sessionless protocol and the second communication mode is a switched connection protocol.

30. A method in accordance with claim 25 further comprising the steps of:
   each RTU communicating short data packets when communicating in the first communication mode; and
   each RTU communicating long data packets longer than the short data packets when communicating in the second communication mode.

31. A method in accordance with claim 25 further comprising the step of ensuring that no more than one RTU of the plurality of RTUs communicating via the network utilizes the shared account identifier to identify itself at any given time.

32. A method in accordance with claim 25 and further comprising the steps of:
   each RTU communicating in the first communication mode via at least one of a cellular control channel and a short messaging services (SMS) protocol; and
   each RTU communicating in the second communication mode via a switched connection protocol.

33. A method in accordance with claim 25 wherein at least one of the first communication mode and the second communication mode is a time-division multiple access mode.

34. A method in accordance with claim 33 wherein the first communication mode and the second communication mode are wireless communication modes.

35. A server for controlling access of a plurality of remote terminal units (RTUs) to a network, said server configured to:
   communicate commands to a first RTU of the plurality of RTUs to conduct a switched connection protocol session via the network;
   assign a shared network account identifier to the first RTU for switched connection protocol access to the network; and
   coordinate usage of the shared network account identifier between the plurality of RTUs.

36. A server in accordance with claim 35 further configured to prevent assignment, to a second RTU, the shared network identifier assigned to the first RTU at least until a switched network connection protocol session of the first RTU has ended.

37. A server in accordance with claim 36 further configured to assign the shared network account identifier to the first RTU via the network utilizing a sessionless protocol.

38. A server in accordance with claim 37 further configured to recognize request received from, and communicate commands to the first RTU via the network utilizing a sessionless protocol.

39. A server in accordance with claim 35 further configured to coordinate exclusive usage of the shared account identifier between the plurality of RTUs.

40. A method for operating a server to control access by a plurality of remote terminal units (RTUs) to a network, said method comprising:
   communicating commands to a first RTU of the plurality of RTUs to conduct a switched connection protocol session over the network;
   assigning a shared network account identifier to the first RTU for switched connection protocol access to the network; and
   coordinating usage of the shared network account identifier between the plurality of RTUs.

41. A method in accordance with claim 40 wherein coordinating usage of the shared network account identifier comprises preventing assignment, to a second RTU, the shared network identifier assigned to the first RTU at least until a switched network connection protocol session of the first RTU has ended.

42. A method in accordance with claim 41 wherein assigning a shared network account identifier to the first RTU comprises transmitting the shared network identifier to the first RTU utilizing a sessionless protocol.

43. A method in accordance with claim 42 wherein recognizing requests received from, and communicating commands to a first RTU comprises recognizing requests received from, and transmitting commands to a first RTU utilizing a sessionless protocol.

44. A method in accordance with claim 40 wherein coordinating usage of the shared account identifier between the plurality of RTUs comprises the step of coordinating exclusive usage of the shared account identifier between the plurality of RTUs.

* * * * *